United States Patent [19]

Copeland et al.

[11] Patent Number: 4,826,661

[45] **Date of Patent: * May 2, 1989**

[54] SOLID BLOCK CHEMICAL DISPENSER FOR CLEANING SYSTEMS

[75] Inventors: James L. Copeland, Burnsville; David L. Nystuen, Bloomington; Lambertus P. van Dijk, deceased, late of Mendota Heights; by Father Peter, administrator Snyder, Holdingford, all of Minn.

[73] Assignee: Ecolab, Inc., St. Paul, Minn.

[ * ] Notice: The portion of the term of this patent subsequent to Aug. 18, 2004 has been disclaimed.

[21] Appl. No.: 858,968

[22] Filed: May 1, 1986

[51] Int. Cl.[4] .............................................. B01D 12/00

[52] U.S. Cl. ...................................... 422/106; 134/93; 137/268; 222/64; 222/185; 422/107; 422/114; 422/263; 422/264

[58] Field of Search ............... 422/263, 264, 105, 106, 422/107, 114, 117; 137/268; 222/64, 66, 67, 185, 189, 190; 134/93; 423/658.5

[56] References Cited

U.S. PATENT DOCUMENTS

| | | | |
|---|---|---|---|
| 1,737,377 | 11/1929 | Kolb | 422/263 |
| 2,308,612 | 1/1943 | Lehmkuhl | 23/272 |
| 2,371,720 | 3/1945 | Stine | 299/83 |
| 2,820,701 | 1/1953 | Leslie | 23/271 |
| 3,612,080 | 10/1971 | Schneider, Jr. et al. | 137/268 |
| 3,727,889 | 4/1973 | Nagel | 259/1 R |
| 4,020,865 | 5/1977 | Moffat et al. | 137/268 |
| 4,063,663 | 12/1977 | Larson et al. | 222/52 |
| 4,426,362 | 1/1984 | Copeland et al. | 422/263 |
| 4,462,511 | 7/1984 | Fulmer et al. | 134/93 |
| 4,687,121 | 8/1987 | Copeland | 422/263 |

*Primary Examiner*—Sidney Marantz
*Assistant Examiner*—Timothy M. McMahon
*Attorney, Agent, or Firm*—Merchant, Gould, Smith, Edell, Welter & Schmidt

[57] ABSTRACT

A dispenser for and method of dispensing a concentrated cleaning solution from a solid block of a cleaning composition wherein the concentrated cleaning solution is dispensed at a substantially constant concentration during the entire useful life of the solid block of cleaning composition. The dispenser comprises (i) a spray nozzle for directing a uniform dissolving spray onto an exposed surface of the solid block of cleaning composition; and (ii) a spring or hydraulic piston coupled to the nozzle for biasing the nozzle towards the solid block and thereby maintaining a substantially constant distance between the nozzle and the exposed surface of the solid block of cleaning composition even though the exposed surface recedes due to dissolution by the dissolving spray.

21 Claims, 6 Drawing Sheets

SOLID BLOCK CHEMICAL DISPENSER FOR CLEANING SYSTEMS

TECHNICAL FIELD

The invention relates broadly to the dispensing of solid water soluble compositions used in cleaning processes. More specifically, the invention relates to the dispensing of a concentrated cleaning solution from a solid block of a cleaning composition. Typically, the concentrated cleaning solution is created by contacting the solid cleaning composition with a dissolving liquid. Cleaning compositions include compounds such as detergents, rinse aids, and the like employed in cleaning fabrics and hard surfaces.

BACKGROUND OF THE INVENTION

Automated institutional and industrial ware-washing machines are generally configured with a single wash tank. The wash tank maintains a readily available supply of a cleaning solution for use in the machine. During normal usage all or a portion of the used cleaning solution is discarded at regular intervals to keep the remaining solution as clean as possible. At the same time fresh or clean recycled water is added to the wash tank to replace the discarded cleaning solution and maintain a constant liquid level. Addition of the fresh water reduces the concentration of detergent or other cleaning composition in the cleaning solution. To maintain the cleaning solution at the most efficient concentration, a measured amount of a concentrated cleaning solution is periodically added to the wash tank by an auxiliary dispenser to form a cleaning solution of the desired strength in the wash tank.

Automated institutional and industrial ware washing machines may also be constructed to add a rinse aid to the rinse water used therein by means of an auxiliary dispenser. The rinse aid promotes sheeting of the rinse water to reduce spotting on the washed ware.

Automated institutional and industrial fabric washing machines typically create a fresh cleaning solution for each cleaning cycle to which is added such cleaning compositions as detergents, bleaches, fabric softeners, and combinations thereof. Typically these cleaning compositions are added to the cleaning solution by auxiliary dispensers.

Chemical dispensers used in the processes described are typically designed for automatic or semi-automatic operation. Automatic dispensers eliminate the need for constant operator attention to cleanliness of the wash water and concentration of cleaning compositions in the wash tank. Further, automated dispensers minimize operator error due to misjudgment in timing or amount of cleaning composition to be added, and provide greater accuracy in maintaining the optimum concentration of cleaning composition in the system.

A number of different techniques have been developed and used for converting a solid cleaning composition into a concentrated cleaning solution. The majority of such devices have been designed to convert solid detergent. See for example Daley et al, U.S. Pat. No. 3,595,438, issued July 27, 1971; Moffet et al, U.S. Pat. No. 4,020,865, issued May 3, 1977; and Larson et al, U.S. Pat. No. 4,063,663, issued Dec. 20, 1977. For this reason cleaning composition dispensers will be further discussed with respect to the dispensing of detergents.

One detergent dispenser technique for converting powdered detergent, is the so-called "water-in-reservoir" type. In the water-in-reservoir type dispensers, an excess of powdered detergent is completely submerged in water to form a saturated concentrated detergent solution having undissolved detergent particles at the bottom of the reservoir. A stand-pipe, usually located near the center of the reservoir, maintains a constant concentrated solution level within the reservoir. As water is injected into the reservoir, a concentrated, often saturated detergent solution or slurry is formed by agitation of the powdered detergent. The added water also causes a portion of the solution or slurry in the reservoir to flow into the stand-pipe, which supplies the wash tank of the washing apparatus with the concentrated detergent solution. Such techniques are not practical for use with powdered detergents containing incompatible components (such as an active chlorine source in combination with a defoamer) as they tend to react upon contact when in solution. Further, there are possible safety hazards involved with the use of such dispensers. The addition of detergent into water-in-reservoir type dispensers requires an operator to place detergent directly into concentrated detergent solution. Since water-in-reservoir type dispensers are typically mounted at about eye level or higher, any splashing or splattering caused by adding the detergent directly into the concentrated solution poses the danger of splashing concentrated detergent solution onto the eyes, face and skin of the operator. This is particularly hazardous when the detergent is highly alkaline or contains other such hazardous chemicals.

Another technique for converting a powdered detergent into a concentrated detergent solution involves the technique of pouring the powdered detergent onto a screen having a mesh size smaller than the powdered detergent particles. A concentrated detergent solution is formed by dissolving the powdered detergent with a spray of water from a nozzle placed on the opposite side of the screen. The concentrated detergent solution formed by the action of the water falls by gravity into an underlying reservoir, or is directed by a conduit directly to the wash tank of a washing apparatus. (See, for example, U.S. Pat. Nos. 3,595,438 issued to Daley et al; 4,020,865 issued to Moffat et al; and 4,063,663 issued to Larson et al.) This technique solves many of the problems associated with the water-in-reservoir type of dispenser as (i) the entire charge of powdered detergent is not wetted, (ii) an operator loading detergent into the dispenser is not placing detergent directly into standing water and therefore is not subjected to possible boil-over or splattering of the concentrated detergent solution, and (iii) the concentrated detergent solution can be used immediately upon being formed, reducing interaction between incompatible components.

While the powdered detergent dispensers such as described by the Daley, Moffat and Larson patents have represented significant contributions to the art of detergent dispensing, the use of powdered solid detergent in general has a number of drawbacks in commercial applications. Due to increased sanitary standards and demands for shorter wash times, recently developed detergents are more complex, increasingly hazardous to the user, less stable, and more difficult to dissolve in a satisfactorily uniform manner. Powdered detergents generally dissolve readily because of their high specific surface areas. However, when the powdered detergent includes components having relatively different dissolving rates, the detergent is susceptible to differential solubility problems in automatic detergent dispensers. Those particles having a greater rate of solubility and/or a greater specific surface tend to dissolve first, whereas those having a lower solubility rate and/or a lower specific surface tend to dissolve last. The extent of this problem depends upon the rate of dispensing and the residence (dwell) time (time of contact between the detergent powder and the dissolving liquid).

Another problem associated with powdered detergents is the incompatibility and/or instability of some useful detergent components when combined in a powdered detergent composition.

Still another problem inherent to powdered detergents is segregation of particles during manufacturing, shipping and handling. Even when uniform distribution can be achieved during manufacture, subsequent shipping and handling may cause segregation. The segregation can lead to non-uniformity in the composition of the detergent when it is withdrawn from the container.

A further disadvantage of powdered detergents is that they are quite susceptible to spillage.

Another form of solid detergent is the briquette form, comprising pre-shaped briquettes of solid detergent. Dispensing systems for dissolving detergent briquettes are known in the art. See, for example, U.S. Pat. Nos. 2,382,163, 2,382,164 and 2,382,165 all issued Aug. 14, 1945 to MacMahon, and U.S. Pat. No. 2,412,819, issued Dec. 17, 1946 to MacMahon. In the MacMahon systems, the detergent briquettes are dispensed from a modified water-in-reservoir type dispenser wherein a number of the briquettes are stacked in a mesh basket forming an inclined slot across the diameter of the reservoir. The lower-most briquette is completely or partly submerged in the water held in the reservoir. A stream of water is directed against the lower-most briquette which, in combination with the swirling action of the water engaging the lower-most briquette, dissolves the briquette and forms a concentrated detergent solution in the reservoir. A stand-pipe maintains a constant concentrated solution level within the reservoir just as in the water-in-reservoir type dispensers. The primary advantages of using detergent briquettes are that the briquettes are easy to handle and the user can visually determine when the detergent dispenser reservoir requires additional detergent. However, as with the water-in-reservoir type dispensers water is left standing in the reservoir, and a portion of the briquettes are submerged within that water. Accordingly, where there are incompatible components within the detergent briquettes, there can be undesirable interaction therebetween. Further, if the detergent contains a defoamer, that defoamer tends to float to the top of the reservoir during periods of inactivity, forming a slag at the water surface. For these and other reasons, the briquette approach has not attained that degree of commercial success in the conventional institutional and industrial cleansing market as has the powdered approach.

Still another, more recent, form of solid detergent is the "cast" or block form, comprising detergent cast into a solid block within a mold or container. Dispensing systems for these solids are known in the art. See, for example, U.S. Pat. Nos. 4,426,362, 4,569,781 and 4,569,780. The cast detergent is typically dispensed in the form of a concentrated detergent solution formed by spraying a dissolving solvent, typically water, onto the detergent block. The concentrated detergent solution is directed into an underlying reservoir or is directed by a conduit directly to the wash tank of a washing apparatus. When the detergent block is completely utilized, the exhausted container is simply removed and a fresh charge placed in the dispenser.

The use of solid cast detergents has presented great innovations to the dispensing of chemicals used in the cleaning process but additional features have been sought by users of solid block dispensers including (i) the ability to provide a relatively constant dispensing rate, (ii) a reduced unit cost of the composition, (iii) further convenience, and (iv) additional safety.

Containers utilized for storing and dispensing of solid cleaning compositions depend upon the form of the composition. Flaked or granular compositions are typically packaged in sturdy paper board containers treated to prevent the passage of moisture into the package. Typically, the granular composition is dispensed from the box by either (i) ripping a hole in the box or (ii) opening a reclosable spout provided on the box. This type of container is unsuitable for nonflowing, solid block cleaning compositions.

Solid cast cleaning compositions are preferably cast directly into a sturdy solid plastic container which can act as a mold, a shipping and storage container, and a dispenser housing. The cast composition is typically dispensed by inverting the container over a fixed position spray nozzle and impinging a dissolving spray onto an exposed surface or surfaces of the compound contained within the container.

Accordingly, a need exists for a dispensing apparatus which can simply, safely, efficiently and inexpensively dispense a homogeneous, uniform, concentrated cleaning solution from a solid block of a cleaning composition; the concentrated cleaning solution dispensed at a substantially constant concentration during the lifetime of the cast cleaner. In certain applications, an additional need exists for an inexpensive solid block chemical container which minimizes the possibility of skin contact with the cleaning composition.

SUMMARY OF THE INVENTION

Figure 2:
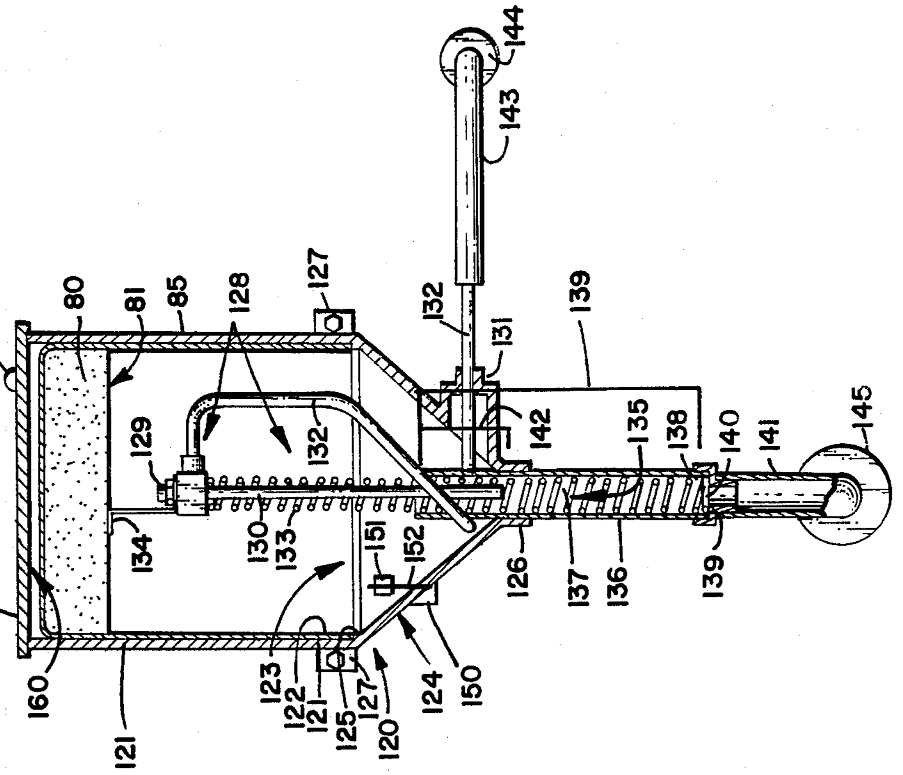
FIG. 2 is a cross-sectional view of a second embodiment of the dispenser of this invention.

The invention comprises a dispenser for creating a concentrated cleaning solution from a solid block of a cleaning composition. The solid block may be retained within its container during dispensing so long as the container leaves at least one surface of the cleaning composition exposed.

The dispenser includes (i) a spray means for directing a uniform spray onto the exposed surface; and (ii) a positioning means in communication with the spray means for maintaining a constant distance between the spray means and the exposed dissolving surface of the cleaning composition as the exposed surface recedes due to dissolution of the cleaning composition by the solvent spray. We have discovered that maintaining a constant distance between the dissolving surface of the cleaning composition and the spray means aids in maintaining a substantially constant solution concentration during the entire lifetime of the cleaning composition block. Failure to maintain a substantially constant distance results in a continuous reduction in the concentration of the solution as the solid block of cleaning composition is used.

The dispenser can be configured to include a housing for sealingly enclosing the spray means and container. The housing aids in collecting and directing the concentrated cleaning solution formed.

While the present invention will be described in combination with a particular configuration of the dispenser housing, it should be understood that other configurations could be designed within the spirit and scope of this invention. Further, while the preferred embodiment of the invention will be described in combination with specific electronic control modules for providing control signals to a spray control means, it should be understood that other control circuits, including mechanical, hydraulic, and optical systems, could equally well be utilized within the spirit and scope of this invention. Similarly, while specific switching circuits and techniques will be described with respect to the preferred embodiments of this invention, other switching means including purely mechanical linkage systems could equally well be utilized within the scope of this invention. Lastly, while specific positioning means for altering the position of the spray means in accordance with a change in position of the exposed surface of the cleaning composition are described, other alternative positioning means including mechanical, hydraulic and electronic means could equally well be utilized within the spirit and scope of this invention.

As used herein, the term "utilization point", when used in combination with concentrated cleaning solution, refers to the point where the solution is used, i.e. a wash tank, a spray rinse nozzle, etc.

As used herein, the term "cleaning composition" refers to those compounds or mixtures commonly added to aqueous liquids present in machine washing units to aid in the cleaning and rinsing of fabrics and wares. Such chemicals include detergents, softeners, bleaches, rinse aids, etc.

DESCRIPTION OF THE PREFERRED EMBODIMENTS INCLUDING A BEST MODE

Figure 1:
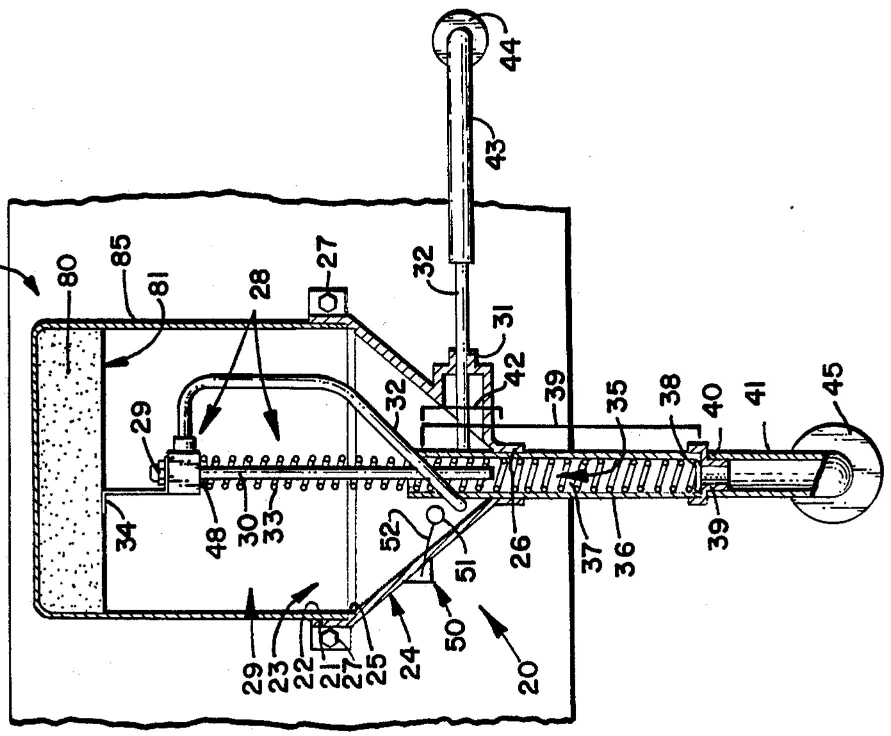
FIG. 1 is a cross-sectional view of one embodiment of the dispenser of this invention.

Referring to FIG. 1, there is generally disclosed a housing 20. The housing has an upper support portion 21 having an inner wall 22. Inner wall 22 defines an internal cavity 23. Preferably upper support portion 21 forms a right angle cylinder.

Inner wall 22 of housing 20 converges in the downward direction, defining a lower funnel-shaped collector portion 24 of housing 20. Housing 20 is configured to form an inner annular container support flange 25 at the juncture of upper storage portion 21 and lower collector portion 24. The lower terminous of collector portion 24 of housing 20 defines an outlet port 26. Outlet port 26 allows concentrated cleaning solution formed in housing 20 to pass out of internal cavity 23 of housing 20.

Housing 20 may be constructed of any suitable material capable of withstanding exposure to the cleaning composition to be dispensed (e.g. highly caustic solutions) and is preferably configured of stainless steel or molded plastic.

A pair of rearwardly extending mounting plates 27 can be coupled to housing 20 for securely mounting housing 20 to a sturdy surface, generally designated as 800.

A spray means, denoted generally as 28, is axially aligned within housing 20 so as to direct an axial spray pattern into internal cavity 23. The preferred spray means 28 comprises a spray nozzle 29 mounted onto a nozzle shaft 30; nozzle shaft 30 extending axially from nozzle 29 toward outlet port 26.

An outwardly projecting coupling portion 31 is extended laterally from collector portion 24 of housing 20. A flexible conduit 32 is secured within coupling projection 31 and projected through inner wall 22 of collector portion 24 of housing 20. The flexible conduit 32 is coupled to nozzle 29 for supplying pressurized fluid thereto. Sufficient flexible conduit 32 is provided between coupling portion 31 and nozzle 29 to prevent conduit 32 from impeding extension nozzle 29.

A preferred positioning means for adjusting the spray means 28 in order to maintain a constant distance between the spray means 28 and the receding exposed surface 81 of the cleaning composition 80 comprises a spring 33 and a feeler bracket 34.

The spring 33 supportably engages nozzle 29 and supportably surrounds nozzle shaft 30. The nozzle shaft 30 is supportably held within axial bore 35 defined by spring 33. The preferred ratio of length of spring 33 to length of nozzle shaft 30 is between about 2:1 to about 10:1.

A rigid support tube 36 is employed to support spring 33. Support tube 36 passes through outlet port 26 and is coupled to housing 20 at outlet port 26. Support tube 36 extends axially outward from internal cavity 23 defining an axial chamber 37. Support tube 36 is configured to form an inner annular spring support flange 38. Preferably spring support flange 38 is at or near the outward terminal end 39 of support tube 38 and the ratio of length of spring 33 to length of axial chamber 37 is between about 2:1 to about 5:1.

Lower portion 39 of spring 33 is supportably encased within support tube 36. The outward terminal end 40 of spring 33 is supportably engaged by spring support flange 38, preventing spring 33 from falling out of support tube 36.

The feeler bracket 34 is mounted onto spray nozzle 29. The feeler bracket 34 extends from spray nozzle 29 for contacting the exposed surface 81 of cleaning composition block 80 and physically preventing spring 33 from forcing spray nozzle 29 any closer to cleaning composition 80. The distance maintained between spray nozzle 29 and cleaning composition 80 is determined by the length of feeler bracket 34.

A solution conduit 41 is sealingly attached to the outward terminal end 39 of support tube 36 for directing concentrated cleaning solution from housing 20 to a utilization point (not shown).

In order to allow concentrated cleaning solution to pass from internal cavity 23 to a utilization point the internal portion 42 of support tubing 36 is perforated with at least one and preferably a plurality of holes 43 allowing concentrated cleaning solution to flow through axial chamber 37 of support tube 36 and into solution conduit 41.

A water supply conduit 43 is coupled to the flexible conduit 32 for providing a source of pressurized water to nozzle 29.

A spray control valve 44 in water supply conduit 43 controls the flow of water through water supply conduit 43 thereby controlling the spray of water out of spray nozzle 29. In operation, spray control valve 44 is normally closed, blocking water flow therethrough and is operative to its open position only upon receipt of an external control signal. Upon receipt of such a control signal, spray control valve 44 opens to water flow therethrough, allowing water to flow through water supply conduit 43 through flexible conduit 32 and out nozzle 29 into engagement with substantially the entire exposed surface 81 of cleaning composition block 80. Spray from nozzle 29 is preferably of relatively low pressure (typically 10 to 25 p.s.i.).

In a second dispenser embodiment, also shown in FIG. 1, solution conduit 41 directs concentrated cleaning solution to a pump 45 which is operative in response to a control signal. In a first embodiment, pump 45 is operative in response to an enabling control signal sent simultaneously to pump 45 and spray control valve 44 thereby ensuring that pump 45 operates only when concentrated cleaning solution is being formed. In a second embodiment, pump 45 is independently controlled, typically by the utilization vehicle, and a level indicator 50 is employed. The level indicator 50 is positioned within collector portion 24 of housing 20 and operatively connected to spray control valve 44. Level indicator 50 senses the level of concentrated cleaning solution in collector portion 24 and accordingly controls the flow of water to nozzle 29 to maintain a relatively constant level of concentrated cleaning solution in collector portion 24. In operation level indicator 50 is normally electronically open, preventing an enabling control signal from reaching spray control valve 44. When the level of solution in collector portion 24 falls below a predetermined minimum level due to operation of pump 45, the level indicator 50 is electronically closed and a control signal is allowed to pass to spray control valve 44. Upon receipt of the control signal, spray control valve 44 opens to the flow of water therethrough and additional concentrated cleaning solution is formed until level indicator 50 indicates that the predetermined minimum level has again been achieved. Upon achievement of the minimum level, level indicator 50 is electronically opened, once again preventing the control signal from reaching spray control valve 44, thereby closing control valve 44 to water flow therethrough and stopping formation of concentrated cleaning solution. Preferably the rate of creation of concentrated cleaning solution is slightly greater than the rate at which concentrated solution is pumped out of housing 20 to prevent the entrainment of air in pump 45. Also, the predetermined minimum level of concentrated cleaning solution should be set below the lowest possible position of nozzle 29 to prevent any interference with the spray of water from nozzle 29.

Figure 6:
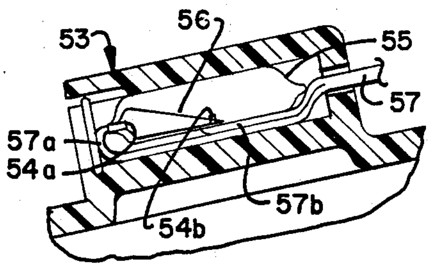
FIG. 6 is a cross-sectional view of one embodiment of a safety control switch which can be mounted upon the door of the dispenser to prevent operation of the dispenser when the door is open.

A first preferred level indicator 50, generally shown in FIG. 1, comprises a float 51 positioned within internal cavity 23 of collector portion 24 of housing 20 and operatively connected by means of a float bar 52 to a level control switch 53. When the level of chemical solution in collector portion 24 of housing 20 falls below the minimum level due to operation of pump 44, level control switch 53 is electrically closed by the change in position of float 51 which alters the angle of float bar 52. A first preferred level control switch 53, shown in FIG. 6, comprises a mercury actuated switch. Referring to FIG. 6, level control switch 53 generally has a pair of contacts **54*a* and 54*b* projecting within an insulating bulb 55 which entraps a fluid conductive medium 56 such as mercury. Switch 53 is mounted upon extension bar 52 such that when extension bar 52 is operatively angled so as to indicate that the level of concentrated solution is at or above a predetermined minimum level, the mercury 56 does not provide an electrical shorting path between first and second terminals 54*a* and 54*b* of switch 53 and level control switch 53 is electrically open preventing passage of an enabling electrical signal to the spray control valve 44. When float 51 is lowered due to a decrease in the amount of concentrated solution in collector portion 24, the angle of extension bar 52 is pivotally altered and the mercury 56 flows within bulb 55 to engage both the first and second terminals 54*a* and 54*b* so as to provide an electrical circuit path between the first and second terminals 54*a* and 54*b*, electrically closing level control switch 53 and allowing passage of an enabling electrical signal to the spray control means 44 opening valve 44 to water flow therethrough. Conduction paths are provided from first and second terminals 54*a* and 54*b* by means of a pair of conductor members 57*a* and 57*b* respectively. Conduction member 57*a* is coupled to a power source 901 and conduction member 57*b* is coupled to spray control means 44**.

Figure 8:
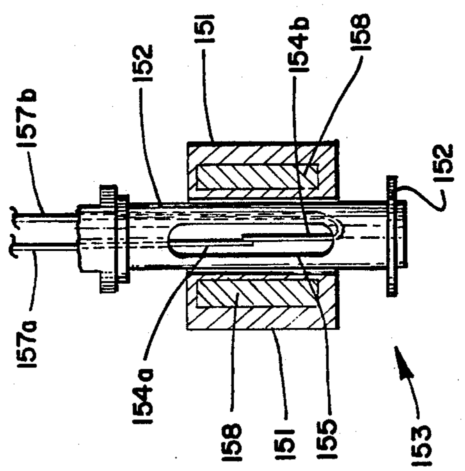
FIG. 8 is a cross-sectional view of a second embodiment of a level control switch which can be utilized to control the operation of the dispenser in relation to the level of solution in the housing.

A second preferred level indicator 150, generally shown in FIG. 2, comprises a generally torroidal float 151. The float 151 is positioned within internal cavity 123 of collector portion 124 of housing 120 and is operatively connected to a level control switch 153 contained within the central rod 152 by means of a magnet 158 located within float 151. When the level of chemical solution in collector portion 24 of housing 20 falls below the minimum level due to operation of pump 44, level control switch 53 is electrically closed by the change in position of float 151 which brings magnet 158 into proper position to electrically close switch 153. The second preferred level indicator switch 153, shown in FIG. 8, comprises a magnetically actuated switch. Referring to FIG. 8, level control switch 153 has a pair of substantially parallel contacts 154*a* and 154*b* projecting within an insulating bulb 155. The contacts 154*a* and 154*b* and insulating bulb 155 are axially aligned within central rod 152. A generally torroidal shaped float 151 containing a magnet 158 surrounds control rod 152. Level control switch 153 is mounted in the collector portion 124 of housing 120 such that when float 151 indicates that the level of concentrated solution is at or above a predetermined minimum level, the magnet 158 does not force contacts 154*a* and 154*b* together to electrically close switch 153 and the switch 153 is electrically open preventing passage of an enabling electrical signal to the spray control valve 144. When float 151 is forced closer to contacts 154*a* and 154*b* due to a decrease in the amount of concentrated solution in collector portion 124 of housing 120, magnet 158 within float 151 also moves closer to contacts 154*a* and 154*b* until magnet 158 is close enough to force contacts 154*a* and 154*b* together so as to provide an electric circuit path between contacts 154*a* and 154*b*, electrically closing level control switch 153 and allowing passage of an enabling electrical signal to the spray control means 144. Conduction paths are provided from first and second contacts 154*a* and 154*b* by means of a pair of conductor members 157*a* and 157*b* respectively. Conduction member 157*a* is coupled to a power source 901 and conduction member 157*b* is coupled to spray control means 144. Magnetically actuated switches substantially as described above which may be usefully employed are available from National Magnetic Sensors, Inc.

This pump-type dispenser is particularly useful when introducing the concentrated solution into a pressurized line or tank or to a remote utilization point and prevents the entrainment of air into pump 45, 145 and early failure of the pump 45, 145.

In a third dispenser embodiment, generally shown in FIG. 2, support portion 121 of housing 120 extends upward so as to define a storage chamber 123 sized to allow an entire container 85 to fit within storage chamber 123. The housing 120 has a storage chamber 123 access port 160 and a door 161 sized to completely cover and sealingly engage access port 160. The door 161 is pivotally mounted to housing 120 for pivotal motion between an open and a closed position.

Figure 7:
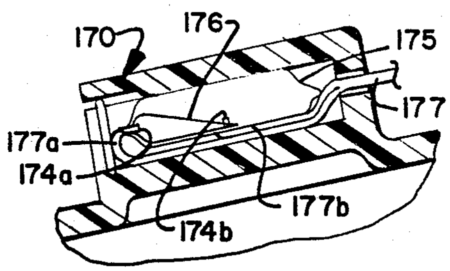
FIG. 7 is a cross-sectional view of one embodiment of a level control switch which can be utilized to control the operation of the dispenser in relation to the level of concentrated solution.

A safety switch 170 is mounted to door 161 and operatively connected to spray control means 144 for sensing the operative position of door 161 relative to access port 160 and controlling the flow of water to nozzle 129 accordingly. In the preferred embodiment, safety switch 170 comprises a mercury actuated switch of the type shown in FIG. 6 and used as a level indicator switch 153. Referring to FIG. 7, safety switch 170 generally has a pair of contacts 174*a* and 174*b* projecting within an insulating bulb 175 which entraps a fluid conductive medium 176 such as mercury. Switch 170 is mounted upon door 161 such that when door 161 is operatively positioned so as to close external access to storage chamber 123 of housing 120, the mercury 176 provides an electrical shorting path between first and second terminals 174*a* and 174*b* of switch 170 electrically closing safety switch 170 and allowing passage of an enabling electrical signal to the spray control valve 144 opening valve 144 to water flow therethrough. When door 161 is pivotally open so as to enable access to chamber 123 of housing 120, the mercury 176 flows within bulb 175 away from engagement with the first terminal 174*a* so as to break the electrical circuit path between first and second terminals 174*a* and 174*b*, electrically opening safety switch 170 and preventing passage of the enabling electrical signal to the spray control valve 144 closing valve 144 to water flow therethrough. Conduction paths are provided from first and second terminals 174*a* and 174*b* by means of a pair of conductor members 177*a* and 177*b* respectively, conduction member 177*a* coupled to level control switch 153 when a pump 145 is used and to a power source 901 when pump 145 is not used; and conduction member 177*b* coupled to spray control valve 144.

Figure 3:
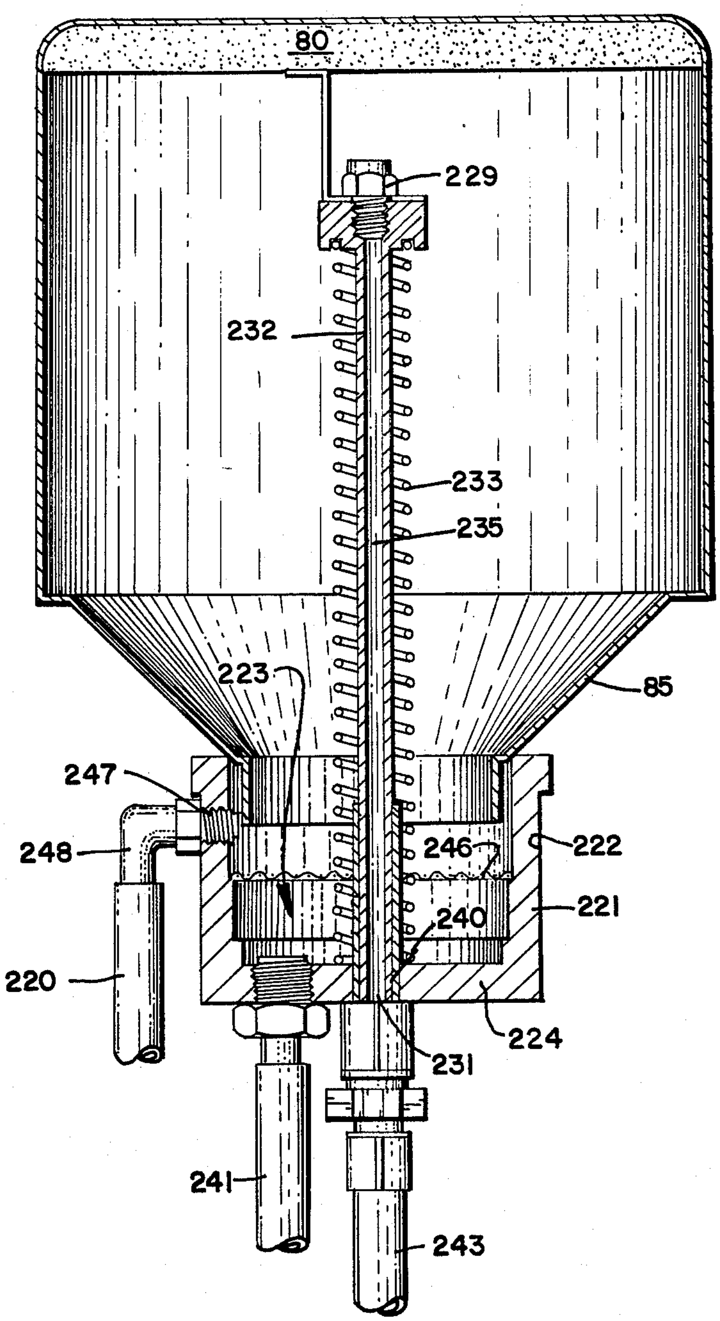
FIG. 3 is a cross-sectional view of a third embodiment of the dispenser of this invention.

In a fourth dispenser embodiment, generally shown in FIG. 3, there is generally disclosed a housing 220. Housing 220 comprises a cup 221 having a side wall 222 and a base 224. Side wall 222 and base 224 define an internal cavity 223. Preferably, cup 221 is configured to form a right angle cylinder.

Internal conduit 232 connects nozzle 229 with a water supply conduit 243. Internal conduit 232 passes from nozzle 229 through axial bore 235 of spring 233 and passes out of internal cavity 223 through an aperture 231. Internal conduit 232 is firmly attached only to nozzle 231 so that the length of conduit 232 in internal cavity 223 can be altered as required by allowing conduit 232 to pass through aperture 231. The terminal end 240 of spring 233 is supportably engaged by base 224 of cup 221.

A screen 246 may be employed within internal cavity 223 to prevent the passage of undissolved chunks of cleaning composition 80 from passing into solution conduit 241 and blocking the flow of concentrated solution. In addition, an overflow port 247 in side wall 222 of cup 221 and an overflow conduit 248 may be employed to direct excess concentrated solution out of internal cavity 223 should solution conduit 241 be incapacitated.

Figure 4:
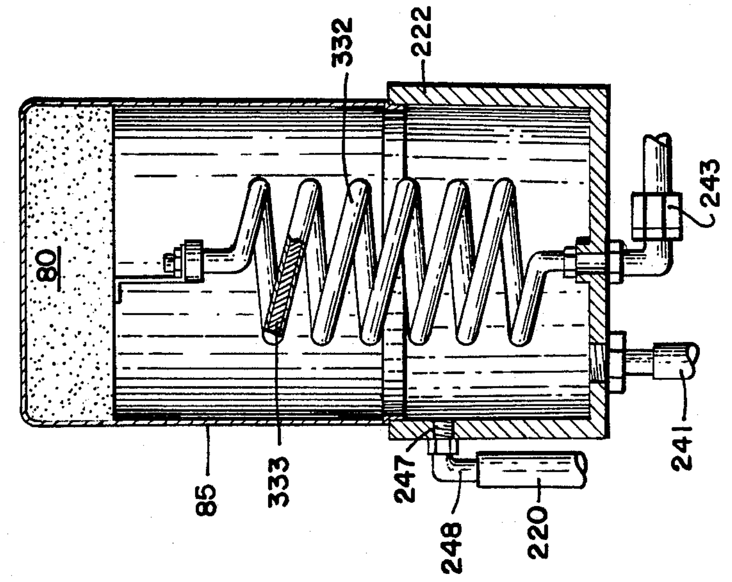
FIG. 4 is a cross-sectional view of a fourth embodiment of the dispenser of this invention.

In a fifth dispenser embodiment, generally shown in FIG. 4, spring 333 is contained within a helixial conduit 332.

Figure 5:
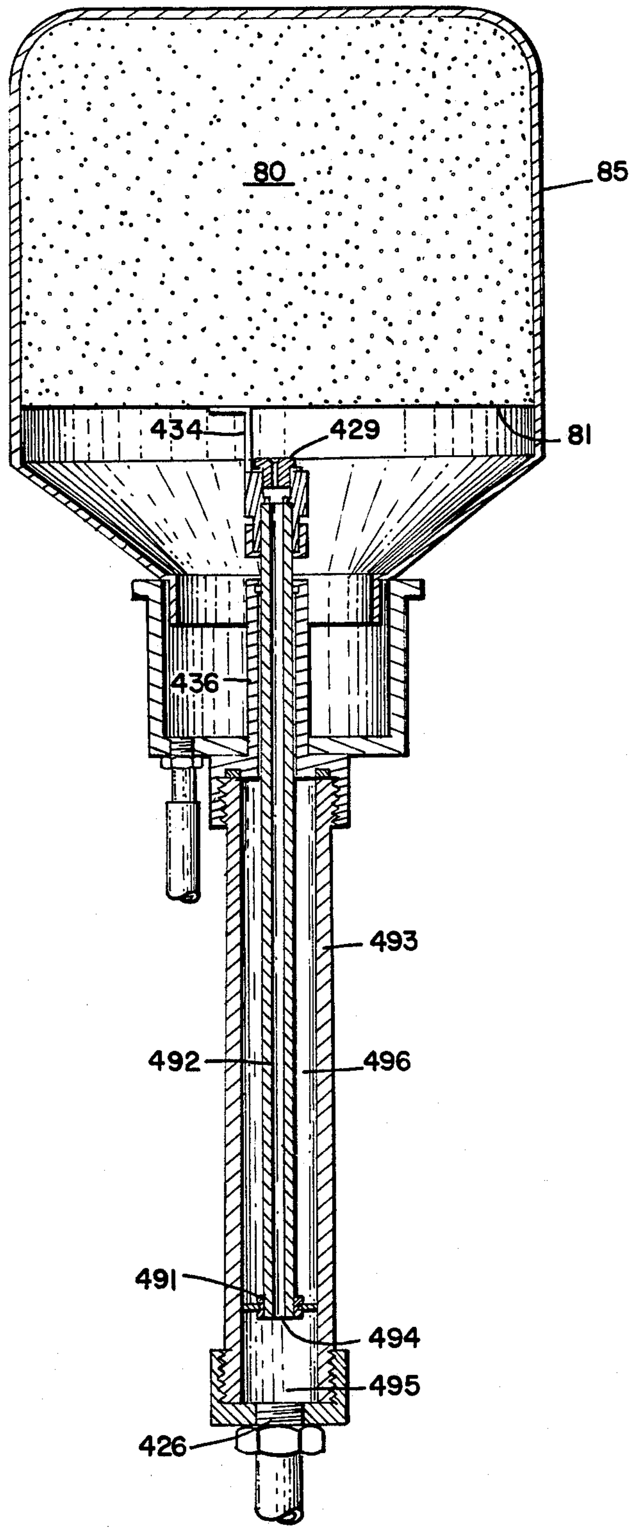
FIG. 5 is a cross-sectional view of a fifth embodiment of the dispenser of this invention.

In a sixth dispenser embodiment, generally shown in FIG. 5, the positioning means for adjusting the spray valve 429 in order to maintain a constant distance between the spray valve 429 and the receding exposed surface 81 of the cleaning composition 80 comprises a hydraulic actuated piston 491 and piston rod conduit 492 housed within a piston housing 493. Piston housing 493 sealingly envelops piston 491 and piston rod conduit 492. Piston 491 divides the internal space of piston housing 493 into a hydraulic chamber 495 and an air chamber 496. Piston housing 493 has a vent aperture 497 for allowing air to freely pass into and out of air chamber 446 and an inlet port 497 for allowing hydraulic fluid to enter hydraulic chamber 495. Piston rod conduit 492 is coupled to nozzle 429 and piston 491 for transferring the motion of piston 491 to nozzle 429. Further, piston rod conduit 492 passes through an aperture 494 in piston 491 allowing pressurized fluid to flow from hydraulic chamber 495 to spray nozzle 429. Piston rod conduit 492 is slideably engaged by tube 436. Support tube 436 supportably and sealingly engages piston rod conduit 492 allowing piston rod conduit 492 to slide along tube 436 yet preventing the passage of concentrated solution from internal cavity 423 into air chamber 496. In operation pressurized hydraulic fluid enters hydraulic chamber 495 through inlet port 426. The pressurized hydraulic fluid in pressure chamber 495 forces piston 491 and hence rigidly attached piston rod conduit 492, nozzle 429 and feeler bracket 434 upward until feeler bracket 434 engages the dissolving exposed surface 81 of cleaning composition block 81. Hydraulic fluid also flows from hydraulic chamber 495 through piston rod conduit 492, through nozzle 429 where it is sprayed onto cleaning composition block 80 dissolving cleaning composition 80 and forming a concentrated cleaning solution.

Further discussion of the dispenser 70 will be made utilizing the dispenser of FIGS. 1 and 2. However, such discussion is equally applicable to all dispenser 10 embodiments.

Figure 9:
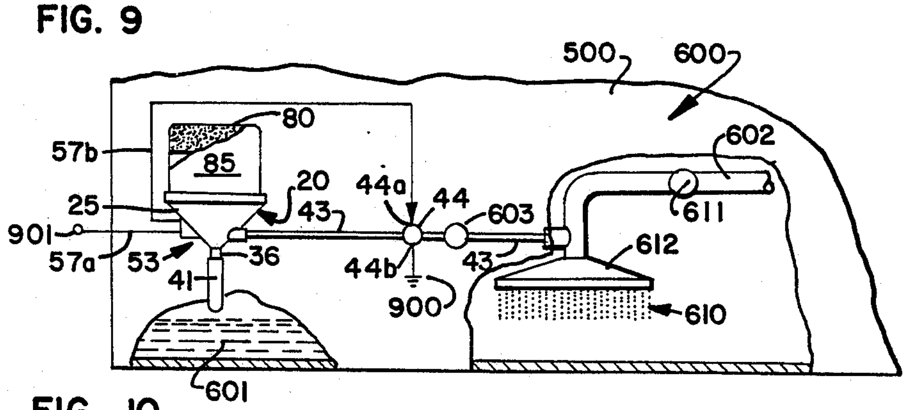
FIG. 9 is a schematic block diagram illustrating the hydraulic and electrical flow paths for the dispenser of FIG. 1.

A block diagram of the electrical and fluid flow paths for a dispenser 10 of the invention having a concentrated solution pump 45 and a level indicator 50 is illustrated in FIG. 9. Referring thereto, dispenser housing 20 is illustrated as mounted to a side wall 500 of a washing machine 600. Washing machine 600 has a wash tank 601 for storing a supply of detergent solution for use within the machine 600. Solution conduit 41 extends from support tube 36 through side wall 500 of washing machine 600 and terminates at a position directly overlying wash tank 601. Washing machine 600 also has a fresh water supply line 602 connected to a pressurized source of water (not illustrated) which provides pressurized clean rinse water to the rinse section 610 of washing machine 600. Water supply line. 602 branches out forming water supply line 43 which provides water to nozzle 29. A rinse valve 611, either manually or electronically controlled, is connected to water supply line 602 at a position upstream from the rinse section outlet 612 and upstream from the water supply line branch 43 for controlling the flow of water to the rinse section 610 and water supply line 43. A flow rate control valve 603 is connected in water supply line 43 to regulate the water flow rate to nozzle 29. A spray control valve 44 is connected in the water supply line 43. The spray control valve 44 is, in the preferred embodiment, a solenoid actuated valve having an input terminal **44*a* and a common terminal 44*b*. The common terminal 44*b* is directly connected to a reference potential 900**.

First conduction path **57*a* leading from level control switch 53 is directly connected to an appropriate power source 901. Second conduction path 57*b* leading from level control switch 53 is directly connected to the solenoid actuated spray control valve 44 at input terminal 44*a***.

Dispensing of chemical block 80 from dispenser 20 is controlled by regulating the flow of water to spray nozzle 29 using rinse valve 611 and spray control valve 44, both of which must be open to allow dispensing to occur.

As shown in FIG. 9, when level indicator 50 is utilized and safety switch 170 is not used, power source 901 is connected to level indicator switch 53 by first conduction path **57*a* and conduction path 57*b* leading from level indicator switch 53 is directly connected to spray control valve 44 at input terminal 44*a***.

Figure 10:
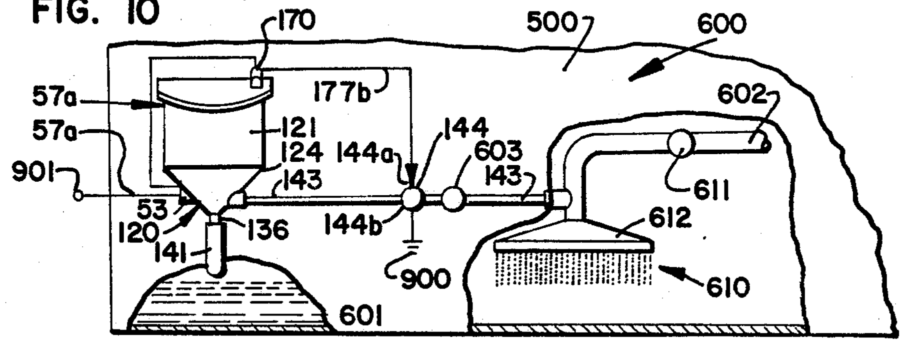
FIG. 10 is a schematic block diagram illustrating the hydraulic and electrical flow paths for the dispenser of FIG. 2.

As shown in FIG. 10, when both level indicator 50 and safety switch 70 are used, the following serial connections are made: (i) power source 901 is connected to level control swtich 53 at input terminal **54*a* by first conduction path 57*a*; (ii) level control switch 53 is connected at output terminal 54*b* to safety switch 170 at input terminal 174*a* by conduction path 57*b*; and (iii) safety witch 170 is connected at output terminal 174*b* to spray control valve 144 at input terminal 44*a* by conduction path 177*b*. In use spray control valve 44 is normally closed to water flow theretrough. Power to open valve 144 to water flow therethrough will reach valve 144 from power source 901 only if level indicator switch 53 is electronically closed (level of solution below minimum) and safety switch 170 is electronically closed (door 161** closed).

Dispenser 20 can be configured with one, both, or neither of the level indicator 50 and the safety switch 170.

For purposes of illustration, a dispenser as shown in FIG. 2 but without level indicator 150 and pump 145, will be described in conjunction with a conductivity sensing means to control the flow of water to spray nozzle 129.

Figure 11:
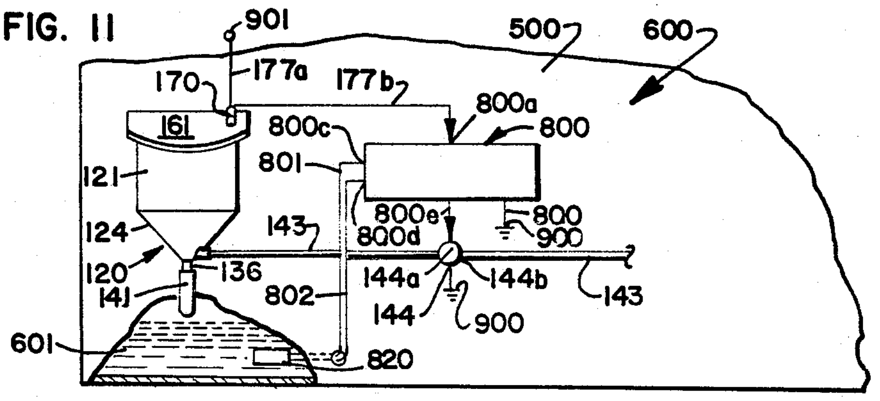
FIG. 11 is a schematic block diagram illustrating the hydraulic and electrical flow paths for an embodiment of the dispenser of this invention which utilizes conductivity sensing means in the wash tank to regulate operation of the dispenser.

Referring to FIG. 11, housing 120 is illustrated as mounted to side wall 500 of a washing machine 600. Washing machine 600 has a wash tank 601 for storing a supply of detergent solution for use within the machine. Conduit 141 extends from support tubing 136 through side wall 500 of washing machine 600 and terminates at a position directly overlying wash tank 601.

Water supply line 143 is directly connected to a source of pressurized water (not illustrated). Solenoid spray control valve 144 is connected to water supply line 143 to control the flow of water through water supply line 143. Valve 144 has an input control terminal **144*a* and a common terminal 144*b* directly connected to a ground potential 900**.

A first conductor **177*a* leading from safety switch 170 is directly connected to a power source 901. A second conductor 177*b* leading from safety switch 170 is connected to a positive power supply input terminal 800*a* of an electronic control module 800. Electronic control module 800 further has a reference supply input terminal 800*b*, a first signal input terminal 800*c*, a second signal input terminal 800*d*, and a signal output terminal 800*e*. Reference supply input terminal 800*b* is directly connected to common potential 900. Signal output terminal 800*e* is directly connected to control input terminal 170*b* of spray control valve 170. First and second signal input terminals 800*c* and 800*d* of electronic control module 800 are directly connected by means of a pair of signal flow paths 801 and 802 to terminals of a conductivity cell 820. Conductivity cell 820 is mounted within reservoir 601 of washing machine 600** for sensing the electrical conductivity of the solution contained therein.

An example of an electronic control module 800 which may be utilized in the present invention is disclosed in U.S. Pat. No. 3,680,070, issued to Marcus I Nystuen. In general, the electronic control module 800 is normally operable to provide a de-energizing signal output at its output terminal **800*e* when conductivity cell 820 indicates the conductivity (i.e. the cleaning chemical concentration level) of the solution within wash tank 601 is at or above a predetermined level, and is operable to provide an energizing output signal at its signal output terminal 800*e* whenever conductivity cell 820 indicates that the conductivity of the solution within reservoir 601 has dropped below the predetermined minimum level. The signal output appearing at output terminal 800*e* of electronic control module 800 is used to energize input control terminal 144*a* of spray control valve 144. The circuits within electronic control module 800 are energized from power source 901 by means of the serially connected safety switch 170. Therefore, whenever safety switch 170 is operative in a non-conducting (open) mode, electronic control module circuits will be disabled, preventing passage of an energizing signal to spray control valve 144, regardless of the conductivity indication status of conductivity cell 820**.

Conductivity cell 820 may be of any type of such cell well known in the art, which provides an electrical output signal that varies in response to the electrical conductivity of the solution in which it is immersed.

It will be understood that other safety control valve 144 activation and deactivation systems and indeed purely mechanical control systems could be used to control the flow of water to nozzle 129 and thereby control the dispensing of chemical 80, within the spirit and scope of this invention.

The container 85 may be made of any sturdy material capable of preventing the passage of the chemical into the surrounding atmosphere. Examples of such chemicals include stainless steel, glass, and thermoplastics such as polyethylene and polypropylene.

Operation of the Preferred Embodiment

In operation, spring 33 is normally pushing feeler bracket 34, spray nozzle 29 and nozzle shaft 30 away from collector portion 24 of housing 20. When the exposed surface 81 of a solid block of cleaning composition 80 is contacted against feeler bracket 34 the weight of container 85 and chemical 80 contained therein will compress spring 33 until container 85 is supportably and sealingly engaged by housing 20. The force exerted by spring 33 is calculated to prevent container 85 from losing sealing engagement with housing 20 as chemical 80 is utilized and spring 33 extended.

Spray control valve 44 is configured so as to be open to fluid flow while in receipt of an energizing signal from a power source 901. When door 161 is raised out of sealing engagement overlying access port 160, mercury 176 within safety switch 170 will be disposed within insulating bulb 175 of safety switch 170 so as to electrically open the signal path between first and second terminals 174*a* and 174*b* of the safety swtich 170, thereby opening safety switch 170 and preventing passage of an energizing signal from power source 901 to spray control valve 144, closing spray control valve 144 and preventing fluid flow to nozzle 129. Door 161 must be closed to allow dispensing to occur. Further, when level indicator 150 indicates that at least the minimum level of concentrated solution is present in collector portion 24 of housing 120, level indicating switch 53 will be electrically open, preventing passage of an energizing signal from power source 901 to spray control valve 144, closing spray control valve 144 and preventing fluid flow to nozzle 129. Level indicator 150 must indicate that the level of concentrated solution within collector portion 124 of housing 120 is below the minimum level to allow dispensing to occur.

Chemical Compositions

Disclosed below in Examples I through VII is a non-exhaustive list of chemical compositions which may be cast or compressed into solid blocks 80 and utilized in the present invention.

EXAMPLE I

High Alkaline Industrial Laundry Detergent

| Raw Material | Wt % |
|---|---|
| Sodium hydroxide - 50% | 26.00 |
| Dequest 2000[(1)] | 17.00 |
| 50% solution polyacrylic acid - 50% M.W. 5000 | 6.50 |

-continued

High Alkaline Industrial Laundry Detergent

| Raw Material | Wt % |
|---|---|
| Nonylphenol ethoxylate 9.5 mole ratio | 14.00 |
| Tinopal CBS[(2)] | 0.075 |
| Sodium hydroxide | 36.425 |
| | 100.0 |

[(1)]Trademark - Monsanto Chemical Co.
[(2)]Trademark - Ciba-Giegy

All ingredients except the sodium hydroxide were mixed together and melted at a temperature of about 170° F. The sodium hydroxide was then added and mixed until a uniform product was obtained. The produce was poured into a container and cooled.

EXAMPLE II

Institutional Dishwashing Detergent

| Raw Material | Wt % |
|---|---|
| Sodium hydroxide 50% solution | 50.0 |
| Sodium hydroxide bead | |
| Sodium tripolyphosphat Detergent | |
| Sodium hydroxide 50% solution | 50.0 |
| Sodium hydroxide bead | 25.0 |
| Sodium tripolyphosphate | 25.0 |
| | 100.0 |

The sodium hydroxide bead was added to the sodium hydroxide 50% solution, heated to 175° F. and mixed. The sodium tripolyphosphate was then added and mixed until uniform, about 10 to 20 minutes. This mixture was poured into a container and cooled rapidly to solidify the product.

EXAMPLE III

Solid Rinse Aid

| Raw Material | Wt % |
|---|---|
| Polyethylene glycol (M.W. 8000) | 30.0 |
| Sodium xylene sulfonate | 20.0 |
| Pluronic [(1)] L62 | 40.0 |
| Pluronic [(1)] F87 | 10.0 |
| | 100.0 |

[(1)]BASF Wyandotte trademark for ethyleneoxidepropyleneoxide block copolymers.

The polyethylene glycol was melted at a temperature of about 160° F. The sodium xylene sulfonate granules or flakes were added and mixed into the polyethylene glycol melt. Pluronic L62 and F87 were then added and mixed until the melt was uniform, about 10 to 20 minutes. The mixture was then poured into a container and allowed to cool and solidify.

EXAMPLE IV

Neutral Hard Surface Cleaner

| Raw Material | Wt % |
|---|---|
| Nonyl phenol ethoxylate 15 moles of ethylene oxide | 80.0 |
| Polyethylene oxide M.W. 8000 | 20.0 |
| | 100.0 |

The nonyl phenol ethoxylate 15 moles of ethylene oxide and polyethylene oxide were mixed together and melted at a temperature of about 160° to 180° F. The product was then poured into a container and cooled below its melting point of about 150° F.

EXAMPLE V

| Laundry Detergent (Low Alkalinity) | |
|---|---|
| Raw Material | Wt % |
| Polyethylene oxide M.W. 8000 | 25.40 |
| Neodol 25-7, Linear Alcohol Ethoxylate[(1)] | 30.0 |
| Dimethyl distearyl ammonium chloride | 3.0 |
| Tinopal CBS, Optical Dye[(2)] | 0.1 |
| Carboxymethyl cellulose | 1.5 |
| Sodium tripolyphosphate | 35.0 |
| Sodium metasilicate | 5.0 |
| | 100.0 |

[(1)]Trade name - Shell Chemical Co.
[(2)]Trade name - Ciba Geigy

The polyethylene oxide and the dimethyl distearyl ammonium chloride were mixed together and melted at a temperature of about 160° to 180° F. The remaining items were then added to the hot melt and mixed until a uniform product was obtained, about 10 to 20 minutes. The mixed product thusly obtained was then poured into a ontainer and cooled below its melting point of about 140° F.

EXAMPLE VI

| Solid Sour Soft | |
|---|---|
| Raw Material | Percent |
| Arosurf TA-100[1] | 12 |
| Hexylene glycol | 13 |

Five hundred, twenty grams of hexylene glycol and 480 grams of Arosurf TA-100 were placed in a 4 liter glass beaker and heated to 180°-190° F. to melt the Arosurf TA-100. This melt was maintained at 190°-200° F. and constantly agitated while 3,000 grams of Sokalan DCS was added. After addition of the Sokalan DCS the mixture was agitated for 30 minutes to ensure a homogeneous mixture, poured into a plastic package and sealed.

The compositions described in Examples I, II and VI are most favorably dispensed in the dispenser of this invention because contact with these highly alkaline products can be harmful.

Other modifications of the invention will be apparent o those skilled in the art in light of the foregoing description. This description is intended to provide concrete examples of individual embodiments clearly disclosing the present invention. Accordingly, the invention is not limited to these embodiments or to the use of specific elements therein. All alternative modifications and variations of the present invention which fall within the spirit and broad scope of the appended claims are covered.

EXAMPLE VII

Two identical cylindrical containers having a diameter of 6 inches and a height of 7 inches were filled with 5,000 grams of detergent as described in Example V. The containers were allowed to cool to room temperature before dispensing.

One of the containers was placed in the dispenser of this invention which maintained a constant distance of about 3.5 inches between the spray nozzle and the exposed erosion surface of the detergent as the detergent was consumed. The other container was placed in a dispenser similar to the dispenser of this invention except that the spray nozzle was a fixed position nozzle and a flat horizontal support screen was used to support the container in an inverted position; the nozzle not being allowed to move as the chemical was consumed. Therefore, the distance between the spray nozzle and the exposed erosion surface of the detergent increased from 3.5 inches to 10.0 inches as the detergent was consumed.

A dispensing cycle was then established for both dispensers whereby water maintained at a temperature of about 128°-131° F. was sprayed at a pressure of 20 psi onto the exposed erosion surface of the detergent for a period of 35 seconds every 20 minutes. At random points in the dispensing cycle the amount of detergent dispensed during a 35 second spray was measured by weighing the container immediately before and after the spray.

Figure 12:
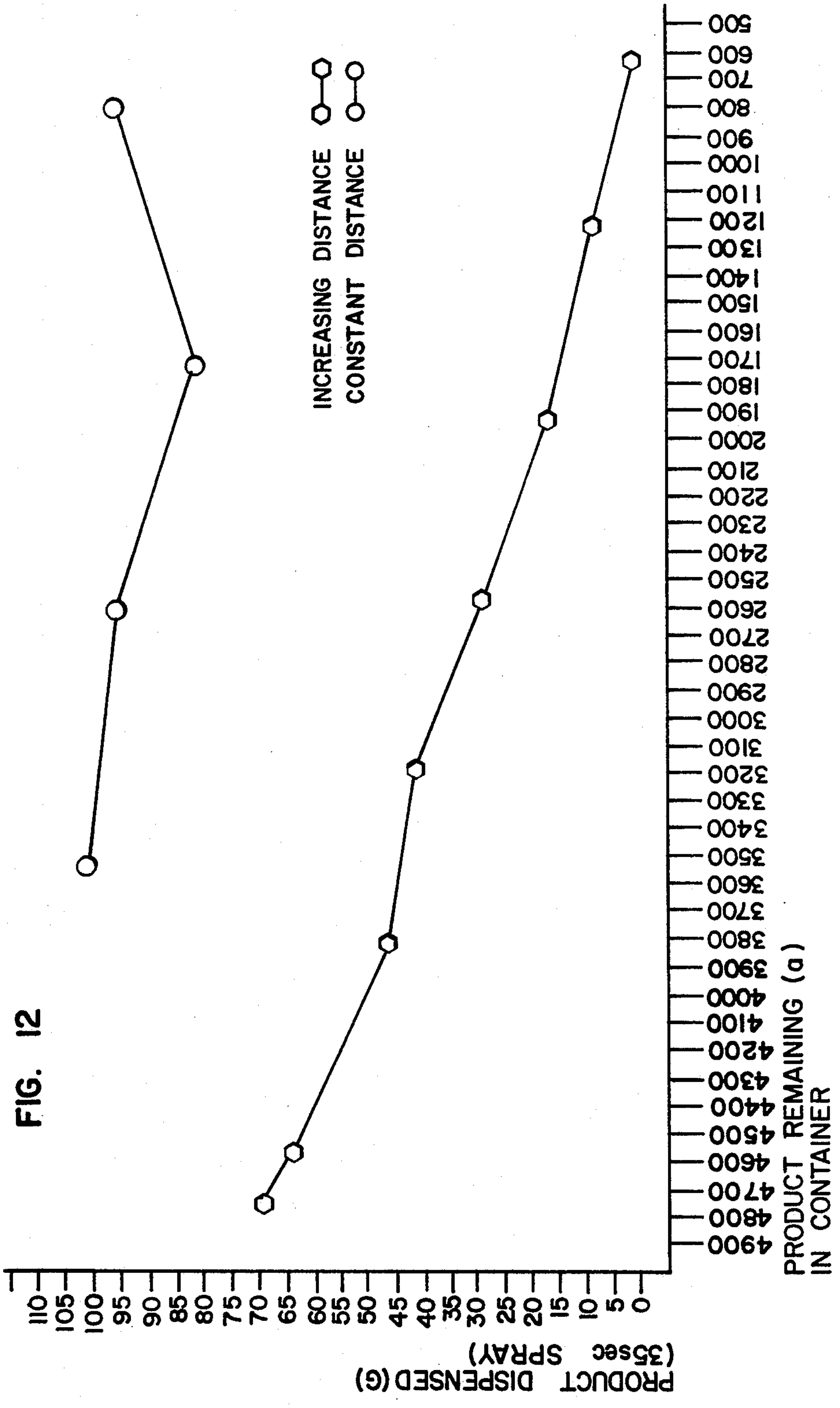
FIG. 12 is a graph which plots the amount of a solid cleaning product dispensed in a spray-type dispenser during the amount of a 35 second spray versus product remaining when the distance between the spray nozzle and the exposed surface (i) increases over time and (ii) remains constant over time.

The results of the experiment are tabulated in Table 1 and graphically depicted in FIG. 12. As is clearly shown in FIG. 12, the concentration of the detergent solution dispensed from the increasing distance dispenser substantially decreases as the detergent is consumed, with about a 10:1 change in the number of grams of detergent dispensed in a 35 second spray during the course of the experiment. In contrast, the concentration of the detergent solution dispensed from the constant distance dispenser of this invention remains relatively constant during the entire consumption of the detergent.

TABLE 1

| Weight of Detergent Before 35 Sec. spray (g) | Weight of Detergent After 35 Sec. spray (g) | Detergent Dispensed in 35 Sec. (g) |
|---|---|---|
| Constant Distance (Nozzle to Detergent) | | |
| 3640 | 3534 | 106.0 |
| 2730 | 2629.7 | 100.3 |
| 1820 | 1731.7 | 88.3 |
| 910 | 807.3 | 102.7 |
| Increasing Distance (Nozzle to Detergent) | | |
| 4825 | 4751 | 74 |
| 4651 | 4583 | 68 |
| 3856 | 3804 | 52 |
| 3243 | 3197 | 46 |
| 2619 | 2585 | 34 |
| 1956 | 1933 | 23 |
| 1257 | 1243 | 14 |
| 641 | 634 | 7.0 |

I claim:

1. A dispenser for a stationary cast solid block of a cleaning composition wherein the cleaning composition is dispensed in the form of a concentrated solution; the dispenser configured to provide the concentrated solution at a substantially constant concentration during the entire useful life of the solid block, which comprises:

(a) a movably mounted spray means for directing a dissolving spray of a solvent at an exposed surface of a stationary solid block of cleaning composition; and (b) a positioning means for positioning the spray means so as to maintain a substantially constant distance between the spray means and the exposed surface of the solid block of cleaning composition as the exposed surface recedes due to dissolution of the cleaning composition by the solvent spray.

2. A dispenser as recited in claim 1 further comprising a container surrounding the stationary solid block of cleaning composition, the solid block having at least one exposed surface.

3. A dispenser as recited in claim 1 further comprising:

(a) a water supply line connecting the spray means with a pressurized source of water; and (b) a spray control means cooperatively connected to the water supply line for selectively controlling the flow of water through the supply line; the spray control means being operative in response to receipt of a control signal to open the water supply line to water flow therethrough, causing the spray means to direct a spray of water against substantially the entire exposed surface of the stationary solid block of cleaning composition.

4. A dispenser as recited in claim 1 further comprising a housing for sealingly contacting a container so as to aid in containing, collecting and directing a concentrated solution formed by the dispenser.

5. A dispenser as recited in claim 4 wherein the housing holds a supply of concentrated solution further comprising:

(a) a water supply line connecting the spray means with a pressurized source of water;

(b) a spray control means cooperatively connected to the water supply line for selectively controlling the flow of water through the supply line; the spray control means being operative in response to receipt of a control signal to open the water supply line to water flow therethrough, causing the spray means to direct a spray of water against substantially the entire exposed surface of the stationary solid block of cleaning composition;

(c) a concentrated solution conduit connecting the housing with a utilization point for directing the concentrated solution formed by the dispenser from the housing to the utilization point;

(d) a pump cooperatively connected to the concentrated solution conduit for selectively controlling the flow of concentrated solution through the concentrated solution conduit; the pump being operative in response to receipt of a control signal to pump concentrated solution conduit and onto the utilization point; and (e) a level indicator, operatively connected to the spray control means for sensing the level of concentrated solution held within the housing; and selectively producing a first and a second electrical signal in response thereto; the level indicator being normally operative, when the level of concentrated solution held within the housing is above a predetermined level, to produce the first electrical signal, causing the spray control means to close to water flow therethrough, and being operable in response to a reduction in the level of concentrated solution within the housing below the predetermined level, to produce the second electrical signal, causing the spray control means to open to water flow therethrough to create concentrated solution.

6. A dispenser as recited in claim 4 wherein the housing comprises:

(a) an upper support portion for sealingly engaging and retaining the container; and (b) a funnel shaped collector portion having a lower outlet port, the funnel shaped collector portion integral with and extending continuously downward from the upper support portion, the collector portion terminating at the lower outlet port from the housing; the upper support portion and collector portion defining an internal cavity.

7. A dispenser as recited in claim 4 wherein the housing comprises:

(a) an upper storage portion defining an upper storage cavity sufficient to retain at least one container with a fresh charge of cleaning composition; the upper storage portion having an upwardly disposed access port for allowing access to the upper storage cavity;

(b) a door operatively engaged to the housing and sealingly positioned across the access port, the door being movable with respect to the access port to open and close access to the upper storage cavity; and (c) a funnel shaped collector portion integral with and extending continuously downward from the upper storage portion, the collector portion terminating at a lower outlet port from the housing.

8. A dispenser as recited in claim 7 further comprising a safety control switch responsive to movement of the door for blocking water spray from the spray means whenever the door is moved from a closed position overlying the access port of the housing, thereby preventing the creation of concentrated chemical solution when the access port is open.

9. A dispenser for a cast solid block of a cleaning composition wherein the cleaning composition is dispensed in the form of a concentrated solution; the dispenser configured to provide the concentrated solution at a substantially constant concentration during the entire useful life of the solid block, which comprises:

(a) a movably mounted spray means for directing a dissolving spray of a solvent at an exposed surface of a stationary solid block of cleaning composition; and (b) a positioning means for positioning the spray means so as to maintain a substantially constant distance between the spray means and the exposed surface of a solid block of cleaning composition as the exposed surface recedes due to dissolution of the cleaning composition by the solvent spray, wherein the positioning means comprises:

(i) a sensing means for sensing the location of the exposed surface of the solid block of cleaning composition; and (ii) an adjusting means in communication with the spray means and operative in response to the sensing means, for adjusting the location of the spray means in response to a change in the location of the exposed surface of the solid block of cleaning composition to maintain a substantially constant distance between the spray means and the exposed surface as the exposed surface recedes.

10. A dispenser as recited in claim 9 wherein:

(a) the sensing means comprises a rigid feeler bracket having a first end coupled to the spray means and a second end extending from the spray means towards the exposed surface of the cleaning composition; the feeler bracket maintaining the spray means at a substantially constant predetermined distance from the exposed surface of the cleaning composition by engaging the exposed surface with the second end of the feeler bracket and physically preventing the spray means from moving any closer to the exposed surface; and (b) the adjusting means comprises a spring having a top end supportably engaging the spray means and an anchored bottom end for biasing the spray means toward the exposed surface of the cleaning composition and maintaining the second end of the feeler bracket in constant contact with the exposed surface of the cleaning composition during the entire useful life of the solid block of cleaning composition.

11. A dispenser for a stationary cast solid block of a cleaning composition wherein the solid block of cleaning composition is dispensed in the form of a concentrated solution; the dispenser configured to provided the concentrated solution at a substantially constant coentration during the entire useful life of the solid block of cleaning composition, which comprises:

(a) a movably mounted spray means for directing a dissolving spray of a solvent at an exposed surface of a stationary solid block of cleaning composition; and (b) a housing for sealingly contacting a container so as to aid in containing, collecting and directing a concentrated solution formed by the dispenser, wherein the housing comprises:

(i) an upper support portion for sealingly engaging and retainer the container; and (ii) a funnel shaped collector poriton having a lower outlet port, the funnel shaped collector portion integral with an extending continuously downward from the upper support portion, the collector portion terminating at the lower outlet port from the housing; the upper support portion and collector portion defining an internal cavity; and (c) a position means for positioning the spray means so as to maintain a substantially constant distance between the spray means and the exposed surface of the solid block of cleaning composition as the exposed surface recedes due to dissolution of the cleaning composition by the solvent spray, wherein the positioning means comprises:

(i) a rigid feeler bracket having a first end coupled to the spray means and a second end extending from the spray means towards the exposed surface of the solid block of cleaning composition; the feeler bracket maintaining the spray means at a substantially constant predetermined distance from the exposed surface of the solid block of cleaning composition by engaging the exposed surface with the second end of the feeler bracket and physically preventing the spray means from moving any closer to the exposed surfaced;

(ii) a linear tube coupled to the collector portion of the housing and passing through the lower outlet port; the linear tube having (i) a central bore, (ii) a first portion extending axially into the internal cavity of the housing, (iii) a second portion extending axially outward from the internal cavity of the housing, (iv) an inner annular flange, and (v) at least one aperture in the first portion to allow the concentrated solution to pass from the internal cavity of the housing into the central bore of the linear tube;

(iii) a spring having a central bore, a top end supportably engaging the spray means and a bottom end supportably engaged by the linear tube inner annular flange for biasing the spray means towards the exposed surface of the cleaning composition and maintaining the second end of the feeler bracket in constant contact with the exposed surface of the cleaning composition during the entire useful life of the solid block of cleaning composition; a sufficient length of the spring supportably retained within the bore of the linear tube for providing lateral support to the spring; and (iv) a shaft coupled to the spray means and extending into the bore of the spring for providing lateral support to the spray means and spring.

12. A dispenser as recited in claim 11 further comprising:

(a) a concentrated solution conduit connecting the tube with a utilization point for directing the concentrated solution from the central bore of the tube to the utilization point;

(b) a water supply line connecting the spray means with a pressurized source of water; and (c) a spray control means cooperatively connected to the water supply line for selectively controlling the flow of water through the supply line; the spray control means being operative in response to receipt of a control signal to open the water supply line to water flow therethrough, causing the spray means to direct a spray of water against substantially the entire exposed surface of the cleaning composition.

13. A dispenser as recited in claim 12 further comprising:

(a) a pump cooperatively connected to the concentrated solution conduit for selectively controlling the flow of concentrated solution through the concentrated solution conduit; the pump being operative in response to receipt of a control signal to pump concentrated solution from the housing, through the concentrated solution conduit and onto the utilization point; and (b) a level indicator, operatively connected to the spray control means, for sensing the level of concentrated solution held within the housing; and selectively producing a first and a second electrical signal in response thereto; the level indicator being normally operative, when the level of concentrated solution held within the housing is above a predetermined level to produce the first electrical signal, causing the spray control means to close to water flow therethrough, and being operable in response to a reduction in the level of concentrated solution within the housing below the predetermined level, to produce the second electrical signal, causing the spray control means to open to water flow therethrough to create the concentrated solution.

14. A dispenser for a stationary cast solid block of a cleaning composition wherein the cleaning composition is dispensed in the form of a concentrated solution; the dispenser configured to provide the concentrated solution at a substantially constant concentration during the entire useful life of the solid block, which comprises:

(a) a movably mounted spray means for directing a dissolving spray of a solvent at an exposed surface of a stationary solid block of cleaning composition; an (b) a housing for sealingly contacting a container so as to aid in containing, collecting and directing a concentrated solution formed by the dispenser, wherein the housing comprises:

(i) an upper storage portion defining an upper storage cavity sufficient to retain at least one container with a fresh charge of cleaning composition; the upper storage portion having an upwardly disposed access port for allowing access to the upper storage cavity;

(ii) a door operatively engaged to the housing an sealing by positioned across the access port, the door being movable with respect to the access port to open and close access to the upper storage cavity; and (iii) a funnel shaped collector portion integral with and extending continuously downward from the upper storage portion, the collector portion terminating at lower outlet from the housing; the upper storage cavity and collector portion together defining an internal cavity; and (c) a positioning means for positioning the spray means so as to maintain a substantially constant distance between the spray means and exposed surface of the stationary solid block of cleaning composition as the exposed surface recedes due to dissolution of the cleaning composition by the solvent spray, wherein the positioning means comprises;

(i) a rigid feeler bracket having a first end coupled to the spray means and a second end extending from the spray means towards the exposed surface of the cleaning composition; the feeler bracket maintaining the spray means at a substantially constant predetermined distance from the exposed surface of the cleaning composition by engaging the exposed surface with the second end of the feeler bracket and physically preventing the spray means from moving any closer to the exposed surface;

(ii) a linear tube coupled to the collector portion of the housing and passing through the lower outlet port; the tube having (i) a central bore, (ii) a first portion extending axially into the internal cavity of the housing, (iii) a second portion extending axially outward from the internal cavity of the housing, (iv) an inner annular flange, and (v) at least one aperture in the first portion to allow the concentrated solution to pass from the internal cavity of the housing into the central bore of the tube;

(iii) a spring having a central bore, a top end supportably engaging the spray means and a bottom end supportably engaged by the support tube inner annular flange for biasing the spray means towards the exposed surface of the cleaning composition and maintaining the second end of the feeler bracket in constant contact with the exposed surface of the cleaning composition during the entire useful life of the solid block of a cleaning composition; a sufficient length of the spring supportably retained within the bore of the tube for providing lateral support to the spring; and (iv) a shaft coupled to the spray means and extending into the bore of the spring for providing lateral support to the spray means and spring.

15. A dispenser as recited in claim 14 further comprising:

(a) a concentrated solution conduit connecting the tube with a utilization point for directing the concentrated solution from the central bore of the tube to the utilization point;

(b) a water supply line connecting the spray means with a pressurized source of water; and (c) a spray control means cooperatively connected to the water supply line for selectively controlling the flow of water through the supply line; the spray control means being operative in response to receipt of a control signal to open the water supply line to water flow therethrough, causing the spray means to direct a spray of water against substantially the entire first exposed surface of the cleaning composition.

16. A dispenser as recited in claim 15 further comprising a safety control switch operatively connected with the door and the spray control means for sensing the operative position of the door and selectively producing a first and a second electrical signal in response thereto, the safety control switch being normally operative, when the door is disposed in a closed position, to produce the first electrical signal and causing the spray control means to open to water flow therethrough, and being operable in response to movement of the door away from the closed position to produce the second electrical signal, causing the spray control means to close to water flow therethrough.

17. A dispenser as recited in claim 16 further comprising:

(a) a pump cooperatively connected to the concentrated solution conduit for selectively controlling the flow of concentrated solution through the concentrated solution conduit; the pump being operative in response to receipt of a control signal to pump concentrated solution from the housing, through the concentrated solution conduit and onto the utilization point; and (b) a level indicator, operatively connected to the spray control means, for sensing the level of concentrated solution held within the housing; and selectively producing a first and a second electrical signal in response thereto; the level indicator being normally operative, when the level of concentrated solution held within the housing is above a predetermined level, to produce the first electrical signal, causing the spray control means to close to water flow therethrough, and being operable in response to a reduction in the level of concentrated solution within the housing below the predetermined level, to produce the second electrical signal, causing the spray control means to open to water flow therethrough to create the concentrated solution.

18. A dispenser for a stationary cast solid block of a cleaning composition wherein the cleaning composition is dispensed in the form of a concentrated solution; the dispenser configured to provide the concentrated solution at a substantially constant concentration during the entire useful life of the solid block, which comprises:

(a) a container surrounding a stationary solid block of cleaning composition, the solid block having at least one exposed surface;

(b) a movably mounted spray means for directing a dissolving spray of a solvent at an exposed surface of the stationary solid block of cleaning composition; and (c) a housing for sealing by contacting the container so as to aid in containing, collecting and directing a concentrated solution formed by the dispenser, which comprises:

(i) an upper support portion for sealingly engaging and retaining the container; and (ii) a funnel shaped collector portion having a lower outlet port, the funnel shaped collector portion integral with and extending continuously downward from the upper support portion, the collector portion terminating at the lower outlet port from the housing;

(d) a 0.5 to 6 inch long rigid feeler bracket having a first end coupled to the spray means and a second end extending from the spray means towards the exposed surface of the cleaning composition; the feeler bracket maintaining the spray means at a substantially constant predetermined distance from the exposed surface of the cleaning composition by engaging the exposed surface with the second end of the feeler bracket and physically preventing the spray means from moving any closer to the exposed surface;

(e) a linear tube coupled to the collector portion of the housing and passing through the lower outlet port; the tube having:

(i) a central bore;

(ii) a first portion 0.5 to 10 inches long extending axially into an internal cavity of the housing;

(iii) a second portion 1 to 20 inches long extending axially outward from the housing;

(iv) an inner annular flange at approximately the terminal end of the second portion of the tube; and (v) a plurality of transverse apertures in the first portion of the tube for allowing concentrated solution to pass from the internal cavity of the housing into the central bore of the tube;

(f) a spring having a central bore, a top end supportably engaging the spray means and a bottom end supportably engaged by the linear tube inner annular flange for biasing the spray means towards the exposed surface of the cleaning composition and maintaining the second end of the feeler bracket in constant contact with the exposed surface of the cleaning composition during the entire useful life of the solid block of cleaning composition; a sufficient length of the spring supportably retained within the bore of the tube for providing lateral support to the spring;

(g) a shaft coupled to the spray means and extending into the bore of the spring for providing the lateral support to the spray means and spring; the ration of length of spring to length of shaft being between 2:1 and 10:1;

(h) a concentrated solution conduit connecting the tube with a utilization point for collecting the concentrated solution from the central bore of the tube to the utilization point;

(i) a water supply line connecting the spray means with a pressurized source of water; an internal portion of the water supply line contained within the housing comprising a flexible material to prevent the water supply line from impeding movement of the spray means;

(j) a spray control means cooperatively connected to the water supply line for selectively controlling the flow of water through the supply line, the spray control means being operative in response to receipt of a control signal to open the water supply line to water flow therethrough, causing the spray means to direct a spray of water against substantially the entire exposed surface of the cleaning composition;

(k) a $\frac{1}{3}$ to $\frac{1}{4}$ horsepower pump cooperatively connected to the concentrated solution conduit for selectively controlling the flow of concentrated solution through the concentrated solution conduit; the pump being operative in response to receipt of a control signal to pump concentrated solution from the housing through the concentrated solution conduit; and (l) a level indicator, operatively connected to the spray control means for sensing the level of concentrated solution held within the housing; and selectively producing a first and a second electrical signal in response thereto; the level indicator being normally operative, when the level of concentrated solution held within the housing is above a predetermined level, to produce the first electrical signal, causing the spray control means to close to water flow therethrough, and being operable in response to a reduction in the level of concentrated solution within the housing below the predetermined level, to produce the second electrical signal, causing the spray control means to open to water flow therethrough to create the concentrated solution.

19. A method for dissolving and dispensing a stationary cast solid block of a cleaning composition wherein the cleaning composition is dispensed in the form of a concentrated solution; the dispenser configured to provide the concentrated solution at a substantially constant concentration during the entire useful life of the solid block, which comprises the steps of:

(a) exposing a surface of the stationary solid block of cleaning composition;

(b) placing the solid block of cleaning composition including container into a dispenser comprising:

(i) a spray means for directing a dissolving spray of water at the exposed surface of the stationary solid block of cleaning composition, the spray means capable of movement relative to movement of the first exposed surface caused by erosion of the first exposed surface in order to maintain a constant distance between the spray means and the first exposed surface of the chemical;

(ii) a positioning means maintaining a substantially constant distance between the spray means and the exposed surface of the solid block of cleaning composition as the exposed surface recedes due to dissolution of the cleaning composition by the solvent spray, the positioning means comprising:

(A) a rigid feeler bracket having a first end coupled to the spray means and a second end extending from the spray means toward the exposed surface of the cleaning composition; the feeler bracket maintaining the spray means at a substantially constant predetermined distance from the exposed surface of the cleaning composition by engaging the exposed surface with the second end of the feeler bracket and physically preventing the spray means from moving any closer to the exposed surface; and (B) a spring having a top end supportably engaging the spray means and an anchored bottom for biasing the spray means toward the exposed surface of the cleaning composition and maintaining the second end of the feeler bracket in contact with the exposed surface of the cleaning composition during the entire useful life of the solid block of cleaning composition; and (iii) a housing for sealingly contacting the container so as to aid in containing, collecting and directing the concentrated solution formed in the dispenser; such that the exposed surface of the cleaning composition contacts the feeler bracket;

(c) allowing the weight of the container and cleaning composition to compress the spring until the container sealingly engages the housing;

(d) spraying water from the spray means onto the exposed surface of the cleaning composition for dissolving the cleaning composition and forming a concentrated solution;

(e) allowing the positioning means to adjust the spray means according to the receding movement of the exposed surface of the cleaning composition to maintain a constant distance between the spray means and the exposed surface during the entire useful life of the solid block of cleaning chemical; and (f) directing the concentrated solution to a utilization point.

20. A method as recited in claim 19 wherein the housing comprises:

(a) an upper storage portion defining a storage cavity sufficient to retain at least one container with a fresh charge of cleaning composition; the storage portion having an upwardly disposed access port for allowing access to the storage cavity;

(b) a door operatively engaged to the housing and sealingly positioned across the access port; the door being movable with respect to the access port to open and close access to the storage cavity; and (c) a funnel shaped collector portion integral with and extending continuously downward from the storage portion, the collector portion terminating at a lower outlet port from the housing; the method of claim 19 further comprises the steps of (i) opening the door to allow access to the storage cavity, and (ii) closing the door after placing the solid block of cleaning composition including container into the housing.

21. A method as recited in claim 19 wherein the spraying step is controlled by a spray control means for selectively controlling the spray of water onto the first exposed surface of the solid block of cleaning composition, the spray control means normally being closed to water flow therethrough and being operative in response to receipt of a control signal to open to water flow therethrough.

* * * * *

UNITED STATES PATENT AND TRADEMARK OFFICE
CERTIFICATE OF CORRECTION

PATENT NO. : 4,826,661

DATED : May 2, 1989

INVENTOR(S) : JAMES L. COPELAND et al

It is certified that error appears in the above-identified patent and that said Letters Patent is hereby corrected as shown below:

Column 11, line 67, for "theretrough" read --therethrough--.
Column 13, line 38, for "swtich" read --switch--.
Column 14, lines 15-16, for "produce" read --product--.
Column 14, lines 20-29 should read:

--

Institutional Dishwashing Detergent

| Raw Material | Wt % |
|---|---|
| Sodium hydroxide 50% solution | 50.0 |
| Sodium hydroxide bead | 25.0 |
| Sodium tripolyphosphate | 25.0 |
| | 100.0 |

--

Column 15, line 25, for "ontainer" read --container--.
Column 17, line 44, for "solution conduit" read --solution from the housing, through the concentrated solution conduit--.
Column 19, line 15, for "provided" read --provide--.
Column 19, line 28, for "retainer" read --retaining--.

UNITED STATES PATENT AND TRADEMARK OFFICE
CERTIFICATE OF CORRECTION

PATENT NO. : 4,826,661

DATED : May 2, 1989

INVENTOR(S) : JAMES L. COPELAND et al

It is certified that error appears in the above-identified patent and that said Letters Patent is hereby corrected as shown below:

Column 19, line 29, for "poriton" read --portion--.
Column 19, line 31, for "an" read --and--.
Column 19, line 53, for "surfaced" read --surface--.
Column 20, line 64, for "an" read --and--.
Column 21, lines 8-9, for "an sealing" read --and sealingly--.
Column 21, line 9, delete "by".
Column 22, line 67, for "sealing by" read --sealingly--.
Column 23, line 3, for "support" read --linear--.
Column 23, line 51, for "ration" read --ratio--.

Signed and Sealed this

Twenty-ninth Day of May, 1990

*Attest:*

HARRY F. MANBECK, JR.

*Attesting Officer*

*Commissioner of Patents and Trademarks*